US011144875B2

(12) United States Patent
Silva et al.

(10) Patent No.: US 11,144,875 B2
(45) Date of Patent: Oct. 12, 2021

(54) SYSTEM AND METHOD OF OPERATING A PROXIMITY-BASED CONTENT DISTRIBUTION NETWORK USING BEACONS

(71) Applicant: THE COCA-COLA COMPANY, Atlanta, GA (US)

(72) Inventors: Meetha Kushala Nirodha Silva, Cincinnati, OH (US); Thomas Neil Garner, Marietta, GA (US); Michael K. Davis, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 107 days.

(21) Appl. No.: 16/494,550

(22) PCT Filed: Mar. 16, 2018

(86) PCT No.: PCT/US2018/022866
§ 371 (c)(1),
(2) Date: Sep. 16, 2019

(87) PCT Pub. No.: WO2018/170399
PCT Pub. Date: Sep. 20, 2018

(65) Prior Publication Data
US 2020/0242542 A1  Jul. 30, 2020

Related U.S. Application Data

(60) Provisional application No. 62/472,401, filed on Mar. 16, 2017.

(51) Int. Cl.
G06F 16/9537 (2019.01)
G06Q 10/08 (2012.01)
(Continued)

(52) U.S. Cl.
CPC ........... *G06Q 10/087* (2013.01); *G01K 13/00* (2013.01); *G06F 16/9537* (2019.01);
(Continued)

(58) Field of Classification Search
CPC .. G06Q 10/087; G06Q 20/18; G06Q 30/0281; G06Q 20/3224; G06Q 20/123;
(Continued)

(56) References Cited

U.S. PATENT DOCUMENTS

2014/0179231 A1   6/2014   Charania et al.
2015/0005011 A1   1/2015   Nehrenz et al.
(Continued)

FOREIGN PATENT DOCUMENTS

CN   105184975 A    12/2015
JP   2015-197901 A  11/2015
(Continued)

OTHER PUBLICATIONS

International Preliminary Report on Patentability issued by the International Bureau of WIPO in PCT Application No. PCT/US2018/022866 dated Sep. 26, 2019. 10 pages.
(Continued)

Primary Examiner — Garcia Ade
(74) Attorney, Agent, or Firm — Meunier Carlin & Curfman LLC

(57) ABSTRACT

One embodiment of a system and method for providing a communications network may include disposing a corresponding set of networked beacons associated with multiple machines positioned configured to provide consumer products to consumers. The beacons may communicate wireless signals with unique data respectively indicative of the networked beacons to a mobile device of a user locally positioned from any of the machines. The unique data may be associated with a local beacon, and cause an app being
(Continued)

executed by the mobile device to communicate the unique data and receive content associated with the local beacon in response to the communication of the unique data.

17 Claims, 9 Drawing Sheets

(51) Int. Cl.
*H04W 4/23* (2018.01)
*G01K 13/00* (2021.01)
*G06Q 20/18* (2012.01)
*H04W 4/021* (2018.01)
*H04W 4/80* (2018.01)
*G06Q 30/02* (2012.01)

(52) U.S. Cl.
CPC ............ *G06Q 20/18* (2013.01); *H04W 4/021* (2013.01); *H04W 4/23* (2018.02); *G06Q 30/0281* (2013.01); *H04W 4/80* (2018.02)

(58) Field of Classification Search
CPC ......... G06Q 20/40155; G06Q 30/0207; G06Q 30/06; G06Q 50/28; G06Q 30/0251; H04W 4/23; H04W 4/021; H04W 4/80; H04W 48/12; H04W 88/18; H04W 4/02; G06F 16/9537; G01K 13/00; H04L 67/20

USPC .......................................................... 705/28
See application file for complete search history.

(56) References Cited

U.S. PATENT DOCUMENTS

| 2015/0100152 A1* | 4/2015 | Barragan Trevino ..... G07F 9/10 700/232 |
| 2016/0171486 A1* | 6/2016 | Wagner .............. G06Q 20/3278 705/39 |
| 2016/0188840 A1 | 6/2016 | Eramian et al. |
| 2016/0277999 A1* | 9/2016 | Graves ................ H04L 67/2804 |

FOREIGN PATENT DOCUMENTS

KR 20160095719 A 8/2016
KR 10-2017-0001787 A 1/2017

OTHER PUBLICATIONS

International Search Report and Written Opinion of the International Searching Authority (ISA/KR) issued in PCT Application No. PCT/US2018/022866 dated Jun. 28, 2018. 13 pages.
Supplementary European Search Report for European Application No. 18768162 dated Sep. 4, 2020.

* cited by examiner

SYSTEM AND METHOD OF OPERATING A PROXIMITY-BASED CONTENT DISTRIBUTION NETWORK USING BEACONS

CROSS REFERENCE TO RELATED APPLICATIONS

This application is a national stage application filed under 35 U.S.C. § 371 of PCT/US2018/022866 filed Mar. 16, 2018, which claims the benefit of U.S. Provisional Patent Application Ser. No. 62/472,401 filed Mar. 16, 2017, the disclosures of which are expressly incorporated herein by reference.

BACKGROUND OF THE INVENTION

Market research has established that brands are continuing to desire and find ways to engage with consumers on a one-on-one basis. One successful technique to engage consumers on a one-on-one basis is to engage consumers on mobile devices at points-of-purchase (e.g., retail stores and restaurants) through "proximity marketing" capabilities. It is believed that by 2018, brands will spend $10 billion on "proximity marketing" services to influence consumers at points-of-purchase and other venues.

One problem that exists with creating "proximity marketing" channels is the ability to install and service communications equipment. Such communications equipment often includes a beacon or wireless communications device that operates a local wireless communications network (e.g., Bluetooth®) that enables mobile devices to communicate therewith. Installation and maintenance of these beacons requires overhead for a provider of the beacons that can be cost prohibitive. As an example, the beacons generally require power and real estate to accommodate the beacons. Moreover, retailers or other owners of points-of-purchase locations can be challenging to contractually engage such that a service provider of the beacons may support a sparsely populated network, thereby resulting in a high-cost network due to installation and maintenance costs of the sparsely populated network.

Retailers or other owners of points-of-purchase locations are also currently limited to only their footprint of owned or managed real estate for establishing a communication channel with the consumer. As an example, a store with three locations can only currently communicate to consumers that are physically at those locations.

Retailers or other owners of points-of-purchase locations are also currently limited to communications to consumers via their owned or managed suite of mobile applications. As an example, a store with a single mobile app with only a small quantity of downloads would have a very limited footprint for mobile communications to occur when in proximity to the points-of-purchase locations.

SUMMARY OF THE INVENTION

Machines that provide consumer products, such as beverages, for consumers may be configured with respective wireless communications devices, such as beacons, with which mobile device of users proximate one of the machines may receive an identifier of the respective beacon. The beacons may be assigned network addresses or beacon IDs to enable a service provider of the machines to define a communications network with millions of nodes that are already positioned within point-of-purchase locations along with other venues. The beacon IDs may be received by local mobile devices (e.g., smart phones) of users, which, when executing one or more mobile apps, may communicate the beacon IDs and other information (e.g., user ID app ID, etc.) to a middleware server for processing and routing of information to one or more content management system (CMS). The CMS may, in turn, process a user ID, beacon ID, geographic location, mobile app ID, or any other information associated with the (i) beacon, (ii) venue at which the machines/beacon is located, (iii) user, and (iv) so on, and communicate selected content back to the mobile device for display thereon. By providing such a communications system, a large communications network that is venue independent that allows for pervasive venue coverage in a non-fragmented manner may be provided. The communications network may also enable point-of-purchase owners to extend customer reach beyond their respective physical spaces and mobile apps.

The configuration of the communications network may also support asset management of the machines with which the beacons are associated. For example, the machines may be configured to collect and communicate machine operational and/or product inventory information via the beacons or separately in a manner that may be communicated to an operator and/or owner of the machines. As an example, if a user of a mobile device has a mobile app that interfaces with the beacon and/or machine, then asset management, such as location, machine status, and current inventory level(s) may be received from the machine despite the mobile app being used for other purposes, such as creating mixed beverages or using rewards points for dispensing a beverage.

One embodiment of a communications network may include multiple machines configured to provide consumer products to consumers, and a corresponding set of networked beacons associated with the machines. The beacons may be configured to communicate wireless signals with unique data respectively indicative of the networked beacons to a mobile device of a user locally positioned from any of the machines. The unique data associated with a local beacon may cause an app being executed by the mobile device to communicate the unique data and receive content associated with the local beacon.

One embodiment of a method for providing a communications network may include disposing a corresponding set of networked beacons associated with multiple machines positioned configured to provide consumer products to consumers. The beacons may communicate wireless signals with unique data respectively indicative of the networked beacons to a mobile device of a user locally positioned from any of the machines. The unique data may be associated with a local beacon, and cause an app being executed by the mobile device to communicate the unique data and receive content associated with the local beacon in response to the communication of the unique data.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1:
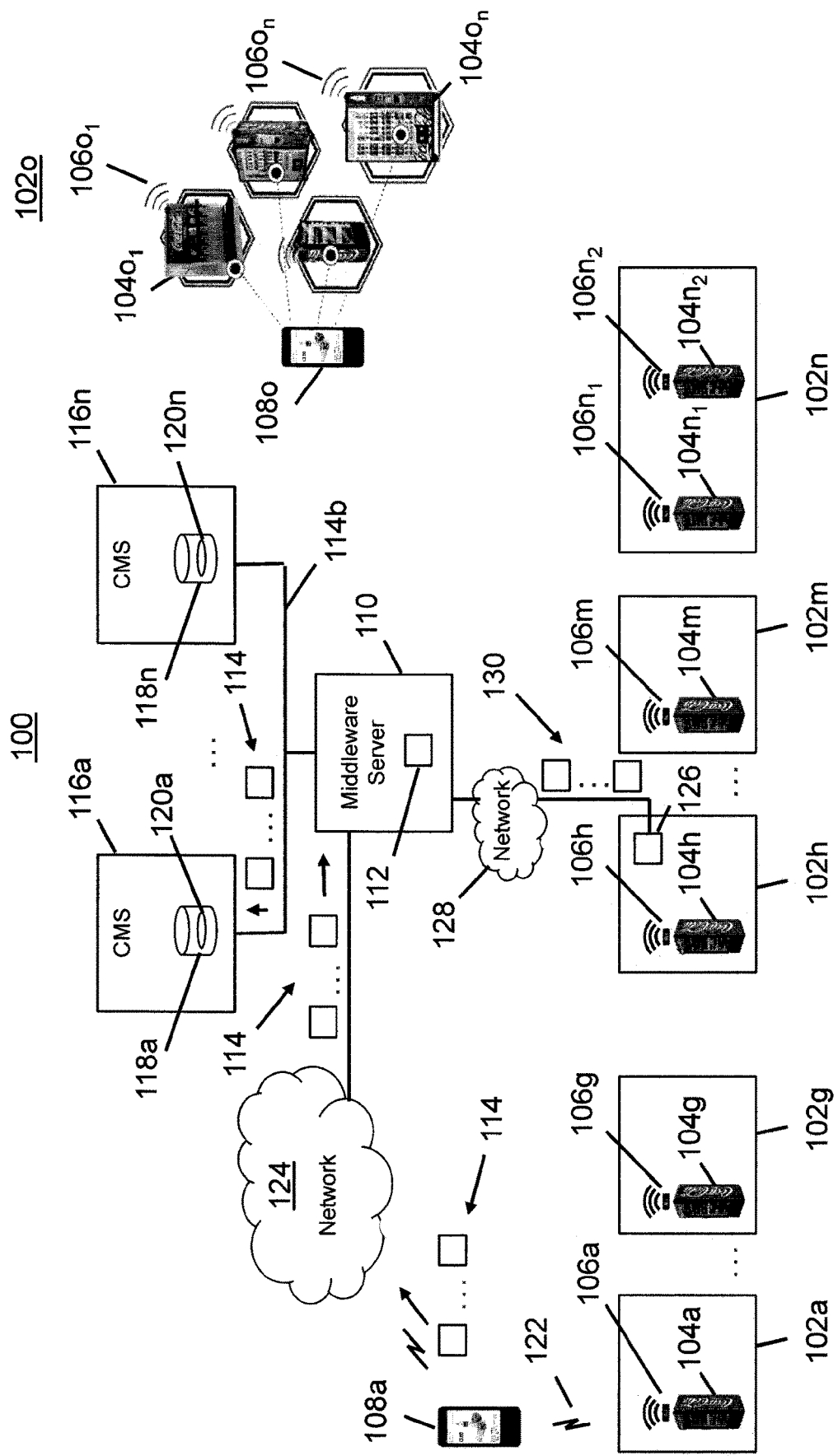
FIG. 1 is an illustration of an illustrative network environment in which machines that provide consumer products, such as beverages, for consumers are configured with beacons configured to communicate beacon ID data with mobile devices proximate to the respective beacons.

With regard to FIG. 1, an illustration of an illustrative network environment 100 showing venues 102a-102g, 102h-102m, 102n, and 102o (collectively 102) including machines 104a-104g, 104h-104m, 104$n_1$-104$n_2$, and 104$o_1$-104$o_n$ (collectively 104) that provide consumer products, such as beverages, to consumers is shown. The venues may be point-of-purchase locations (e.g. retail chain stores), public locations (e.g., streets, train stations, airports, etc.), and/or private locations (e.g., businesses). The machines 104 may be configured with beacons 106a-106g, 106h-106m, 106n, and 106o (collectively 106) that wirelessly communicate using a local wireless communications protocol with mobile devices 108a-108o (collectively 108). The venues 102 may be retail stores, grocery stores, restaurants, malls, sports venues, airports, walkways, or any other public or private location at which a consumer may purchase a consumer product, such as a beverage, from machines 104. The machines 104 may be vending machines, coolers, dispensers, or any other machine configured to provide consumer products for consumers to purchase or otherwise obtain. In an embodiment, the beverages may be soft-drinks, fruit beverages, still beverages, water, and so on. As understood in the art, the machines 104 may be serviced by a service provider that installs, moves or repositions, and maintains the machines 104, as well as restocks inventory in the machines 104.

The machines 104 are shown to be positioned within the various venues 102 in which power and real estate, such as floor space or counter space, are provided to the machines 104. It should be understood that any number of machines 104 and combinations of machines may be positioned within the various venues 102.

Each of the beacons 106 may be networked by having an assigned network address and/or device ID. In being networked, the beacons 106 may have a unique network identifier (ID), such as a MAC or IP address, or device ID. The beacons 106 may also be configured with other data that uniquely identifies the beacons 106. Each of the respective machines 104 and beacons 106 may be provisioned as a pair so as to support asset management functionality. For example, the beacons 106 may be provisioned with geographic or other location stand-alone location. In addition, each of the machines 104 may have a machine ID, and the machine ID and network address or identifier of the respective beacons 106 may be associated with one another in a data repository, such as a relational database, operating on a network server or elsewhere. Moreover, specific names or identifiers of geographic location within each of the venues 102 may be provisioned. For example, if a point-of-purchase or venue (e.g., mall) 102n has multiple machines, then position of the machines 104$n_1$-104$n_2$ within the venue 102n may be stored in association with each of the respective machines 104$n_1$-104$n_2$ in the venue 102n.

More specifically, a first machine 104$n_1$ may be positioned near an entryway of the venue 102n and a second machine 104$n_2$ may be positioned within a center of the venue 102n. The relative positions of the machines 104$n_1$-104$n_2$ may be recorded in a data repository, so that in response to a user of a mobile device passing from the first machine 104$n_1$ to the second machine 104$n_2$, a message based on that relative motion of the user passing from the first machine 104$n_1$ to the second machine 104$n_2$ may be communicated to the mobile device of the user. For example, upon entry at the venue 102n, a message "welcome to the store," may be communicated to a mobile device of the user, and upon approaching the second machine 104$n_2$, a message, such as "thank you for shopping at our store, you earned a 5% discount today" may be communicated to the mobile device of the user. Reverse messaging may be made if the mobile device passes from the second machine 104$n_2$ to the first machine 104$n_1$, where the messaging may be "please see one of our sales assistants for any questions or needs," to "enjoy your time in the mall, come back within 1 hour for a 5% discount on handbags."

As shown, the network environment 100 may include a middleware server 110 that executes software 112 that utilizes logic to process data communicated in communications signals 114 by the mobile devices 108. The software 112 may determine which one of one or more content management system(s) (CMS) 116a-116n (collectively 116) to route the communications signals 114 may be routed based on a variety of different factors, such as venue or location of the machine at which a beacon is associated. The content management systems 116 may include respective storage units 118a-118n (collectively 118) on which data repositories 120a-120n (collectively 120) are stored. The data repositories 120 may be configured to store content to be sent on a scheduled or non-scheduled basis to the mobile devices 108 of users that receive beacon communications when proximate the beacons 106, as further described herein. Being scheduled means that the content may be communicated to users during certain days and times of days. Other types of scheduling are possible, as understood in the art.

As an example, in response to the mobile device 108a receiving a beacon signal 122 that may include a unique network address or beacon ID associated with the beacon 106a, the mobile device 108a executing a mobile app may communicate the communications signals 114 via communications network 124 to the middleware server 110 for routing to one of the CMSs 116, as further described herein. In an alternative embodiment, the mobile device 108a may be configured to communicate the communications signals 114 to one of the CMSs 116 directly (i.e., independent of the middleware server 110). In an embodiment, a Wi-Fi® or other wireless access point 126 may be disposed on the machine 104h, and operate to communicate via a communications network 128 to the middleware server 110 or other networked server. Data packets 130 may include data associated with the machine, and be used for provisioning, inventory management, or otherwise. The communications may be bi-directional so that the machines may be updated with software or data.

Figure 2:
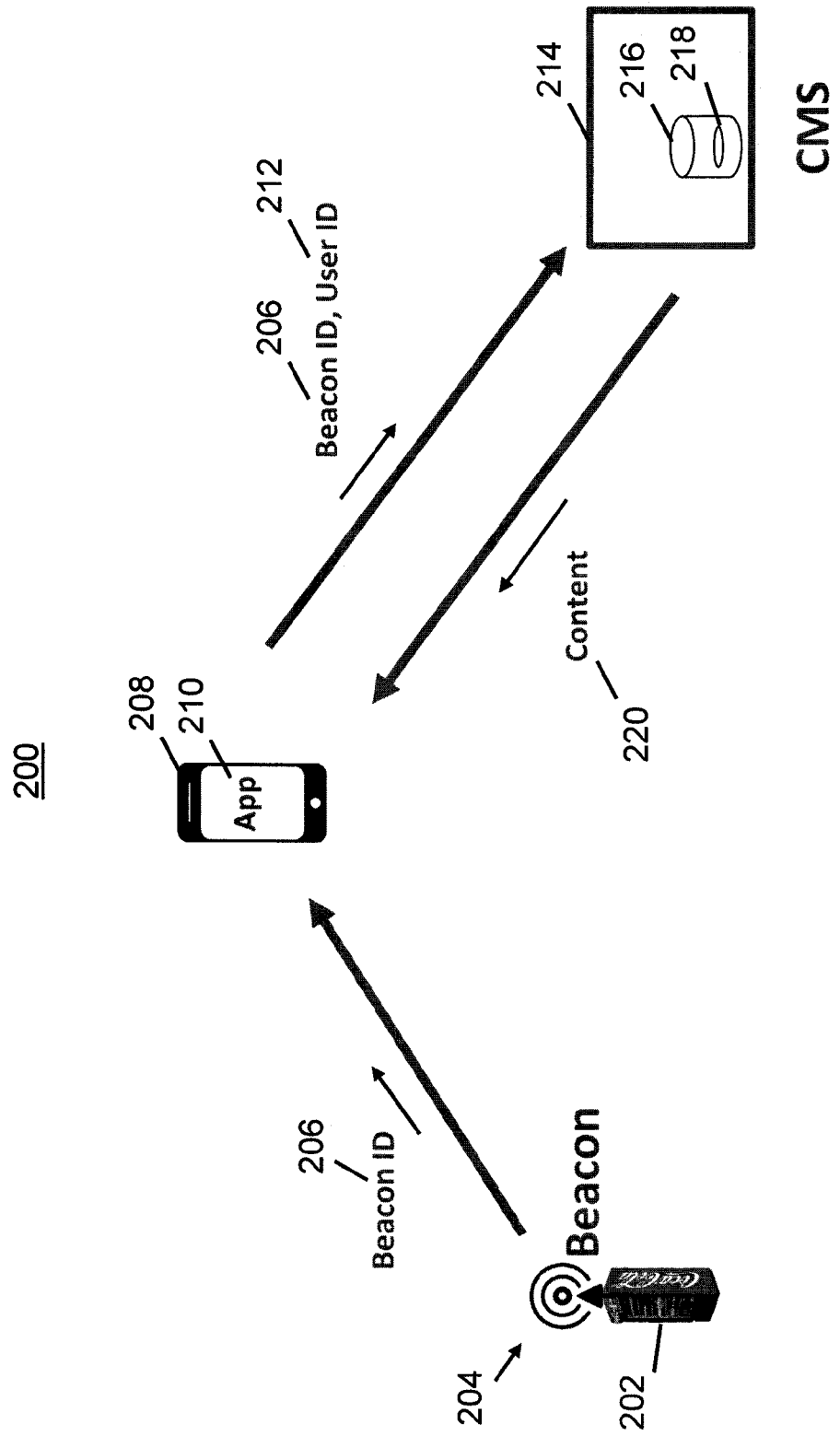
FIG. 2 is an illustration of an illustrative network environment in which a machine for dispensing consumer products, such as beverages, may be configured with a beacon located thereat.

With regard to FIG. 2, an illustration of an illustrative network environment 200 in which a machine 202 for dispensing consumer products, such as beverages, may be configured with a beacon 204 is shown. The beacon 204 may be powered by the machine 202 (internally or externally) or local power source (e.g., power outlet) used to power the machine 202. The beacon 204 may be configured to communicate a beacon ID 206 to a mobile device 208 that is in local proximity to the beacon 204. The mobile device 208, which may be executing a mobile app 210 that is produced in conjunction with a software development kit (SDK), as understood in the art, may be configured to receive and process the beacon ID 206. In response to receiving the beacon ID 206, the mobile device 208 executing the mobile app 210 may communicate the beacon ID 206 along with a user ID 212 or other user identifier to a content management system 214. In an embodiment, the mobile device 208 may communicate the beacon ID 206 and user ID 212 directly to the CMS 214 or to the CMS 214 via a middleware server (not shown) for configured to route data to one of multiple CMSs, as described with regard to FIG. 1.

The CMS 214 may include or be in communication with a storage unit 216 on which a data repository 218 may be stored, and the CMS 214 may identify content 220 stored in the data repository 218 to communicate to the mobile device 208 for display on or otherwise used by the mobile app 210 being executed by the mobile device 208. The content 220 may be selected based on the beacon ID 206 and/or user ID 212. For example, if the beacon ID 206 is associated with a particular retailer, such as a grocery store, then only content intended to be presented to users within that retailer (or retail chain) is to be selected and communicated to the mobile device of the user. In another embodiment, the data repository 218 may be configured to store or otherwise have access to data inclusive of demographics, geographics, or other metadata of the user, and based on the user ID 212, content 220 may be selected that is related to the user. For example, metadata or information associated with the user may include age, gender, marital status, number of kids, and so forth, and content that is related to that information may be selected and communicated to the mobile device 208 by the CMS 214.

Figure 3:
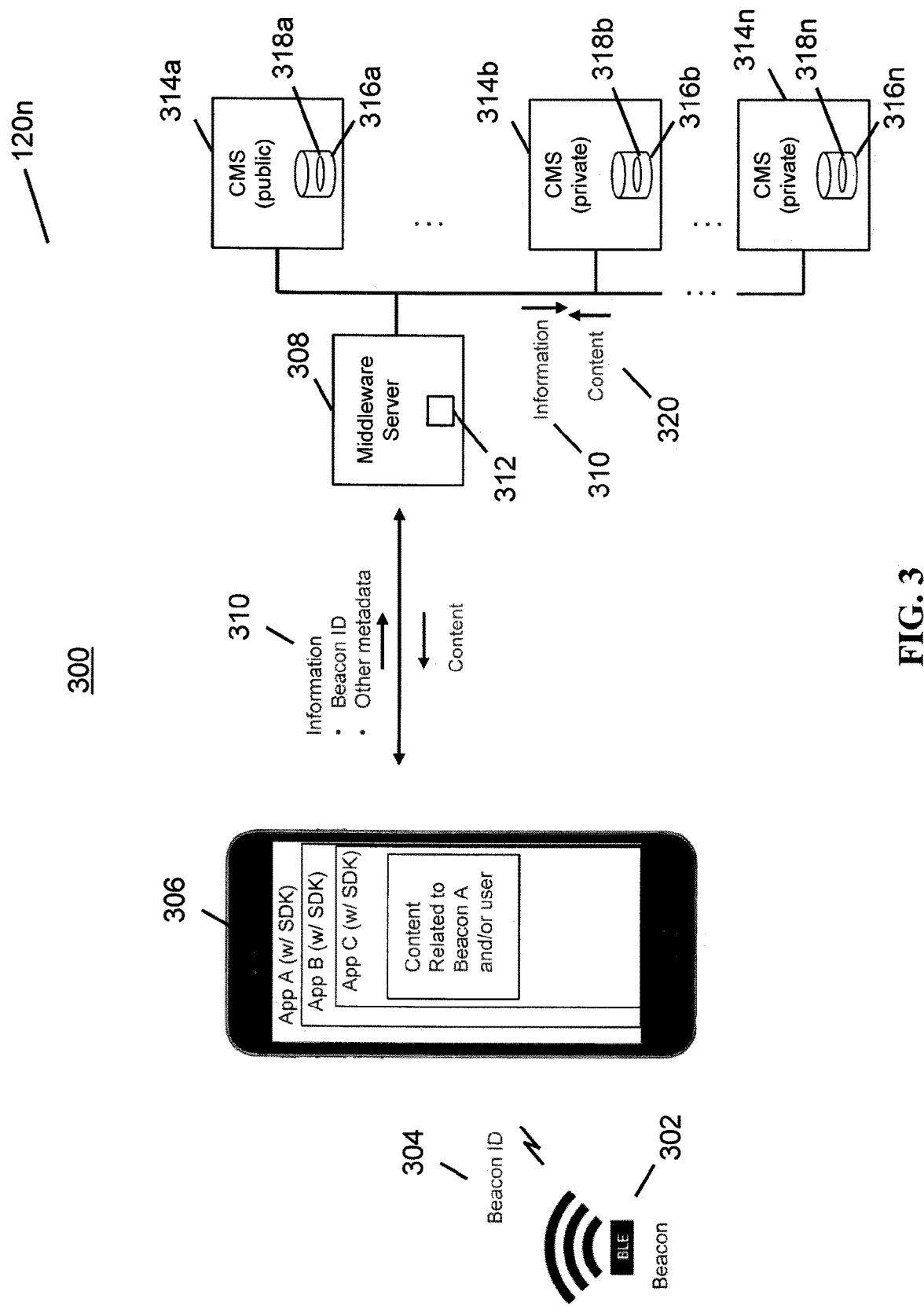
FIG. 3 is an illustration of an illustrative network environment.

With regard to FIG. 3, an illustration of an illustrative network environment 300 is shown. The network environment 300 may include a beacon 302 associated with a machine (not shown), and be configured to communicate a beacon ID 304 using a Bluetooth® or other local wireless communications protocol that may be received by mobile devices, as understood in the art. The beacon ID 304 may be a unique ID associated with the beacon 302 relative to all other beacons in a communications network, and the communication may include additional metadata associated with the beacon. For example, the metadata may include a venue ID, venue name, geographic identifier, or any other information, as understood in the art. In an embodiment, the beacon 302 may be a conventional beacon configured to perform one-way communication and optionally use handshaking for that communication. In an alternative embodiment, the beacon 302 may be configured to receive and communicate data other than a beacon ID or metadata, such as information associated with a machine (not shown) at which the beacon 302 is positioned. For example, the beacon 302 may be configured to communicate operational data associated with the machine, inventory of consumer products available at the machine, or otherwise.

The network environment 300 may further include a mobile device 306 of a user or consumer that is locally positioned relative to the beacon 302. In an embodiment, the beacon 302 may be configured to communicate a wireless communications signal at a distance specified by a communications protocol, such as Bluetooth®. In an embodiment, a range of a communication signals may be 300 feet or higher. Alternative ranges may be possible, as well. In an embodiment, the beacon 302 may be configured to communicate using a fixed power level for all communications. In an alternative embodiment, the beacon 302 may be configured to communicate using a variable power level, as further described herein.

The mobile device 306 is shown to be executing multiple mobile apps A-C that may be developed with an SDK, as understood in the art. The mobile apps A-C may be produced by one or more publisher of mobile apps, and may be configured to utilize the beacon ID 304 during execution. For example, the beacon ID 304 may be communicated by the mobile device 306 along with other metadata 308 that the respective app may utilize. As a result of using the SDK, the beacon ID 304 may be identified and cause the mobile device 306 to automatically identify and/or activate any of the apps that are being executed by the mobile device 306 to use and/or communicate to a middleware server 308. The app(s) may be configured with a network address of the middleware server 308 to which to send information 310 that may include the beacon ID 304 and other metadata. The other metadata may include user ID, geographic location, app identifier, and/or any other information that may be used for selection of content to be used by the mobile apps A-C, as further described herein.

The middleware server 308 may be configured with software 312 that performs logic for routing the information 310 to one or more content management systems 314a-314n (collectively 314). As shown, CMS 314a may be a public CMS, and may be configured with a storage unit 316a on which a data repository 318a may be stored. The content may be communicated to mobile devices that are positioned proximate (within a local wireless communication distance) any or all of the beacons so as to be operable as a public broadcast system. The public CMS 314a may, therefore, communicate content across multiple "private" sub-networks, such as a sets of beacons located within different retail chains, on the communications network formed by network beacons positioned at machines configured to dispense consumer products, as previously described. Private CMSs 314b-314n may be operated by one or more publishers of content, and may operate storage units 316b-316n that store data repositories 318b-318n.

The middleware server 308, in executing the software 312, may select one or more of the CMS servers 314 to communicate the information 310. In response, a CMS server that is selected may be configured to select or identify content 320 determined to be associated with or be best matched to parameters contained in the information 310 to communicate to the mobile device 306. The communication of the content 320 may be sent via the middleware server 308 or directly via a communications network (not shown), such as a cellular communications network, as understood in the art. In selecting the content 320, a CMS may use any or all of the information 310 (e.g., beacon ID, user ID, app ID, geographical location, user demographics, timestamp, etc.)

for selecting the content 320. The selected content 320 may be used or displayed by any of the apps being executed by the mobile device 306. The content 320 may include a wide range of content, including information, rewards, tickets, machine readable codes, messaging, notifications, alerts, game pieces, or any other content, as understood in the art. In an embodiment, the content 320 may be communicated using any number of communications protocols available to be communicated to the mobile device 306, including content to be displayed by a mobile browser, SMS messaging, voice messaging, or otherwise.

Figure 4:
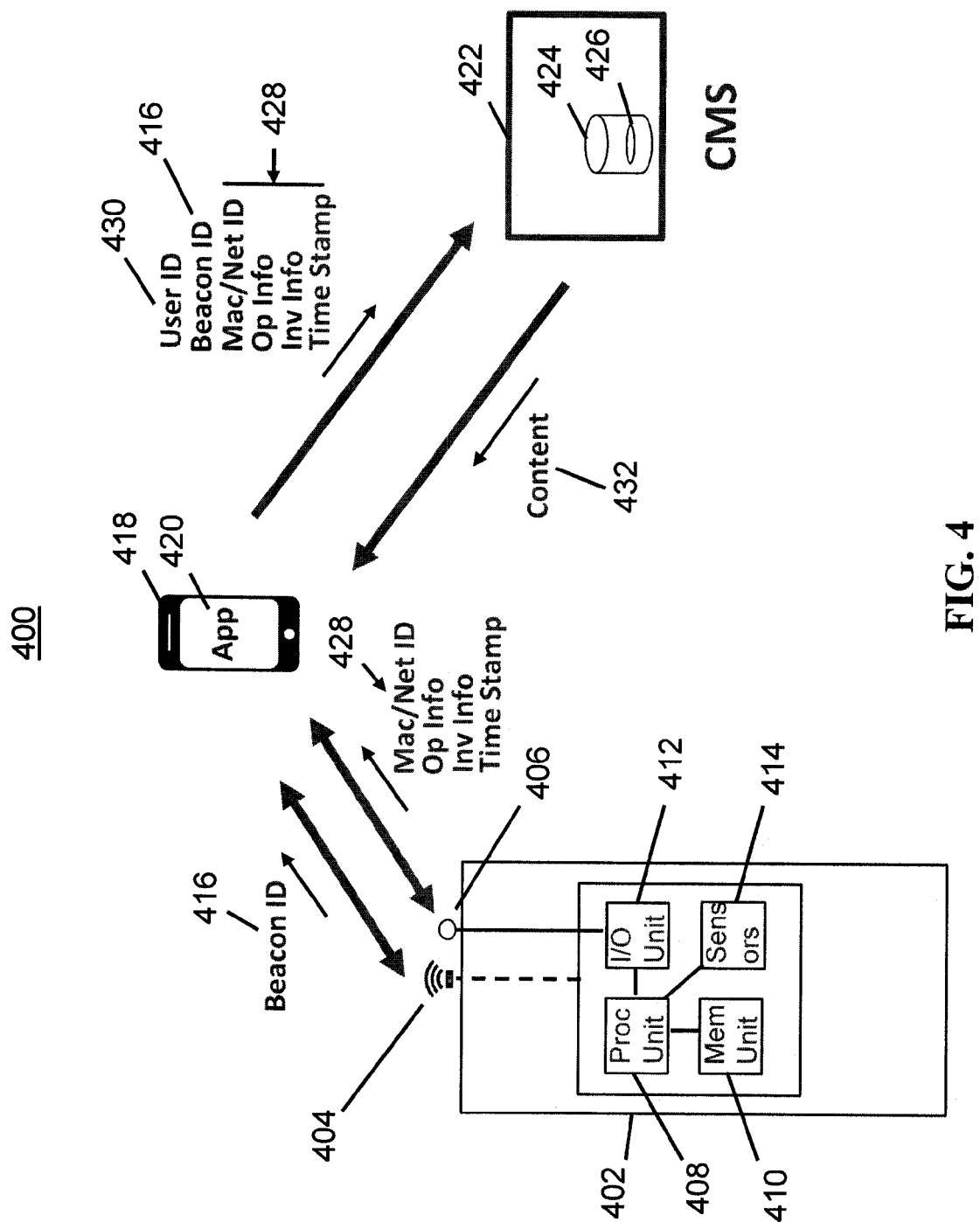
FIG. 4 is an illustration of an illustrative network environment in which a machine that provides consumer products (not shown) to consumers is configured with a beacon.

With regard to FIG. 4, an illustration of an illustrative network environment 400 in which a machine 402 that provides consumer products (not shown) to consumers is configured with a beacon 404 is shown. In an embodiment, the machine 402 may also be configured with another antenna 406 that may be used to wirelessly communicate additional information, as previously described herein. The machine 402 may be configured with a processing unit 408 that executes software to operate the machine, for example, but also to be used for collecting information associated with the machine. The processing unit 408 may be in communication with a memory unit 410 that may be used to store information associated with the machine 402, where the information may include operational data of the machine and/or inventory data of consumer products available to be dispensed or otherwise provided to a consumer by the machine 402. An input/output (I/O) unit 412 may be in communication with the processing unit 408, and be configured to communicate with the beacon 404 and/or antenna 406 for communicating data over a communications network (e.g., local wireless communications network and/or wide area network).

In an embodiment, sensors 414 may be utilized by the machine 402 for monitoring various operational parameters, such as temperature, door openings and closings, geographic location, audio, visual, functional operation (e.g., pump operation), or any other information that may be useful in supporting communications with users of mobile devices that are at or near the machine 402. The operational parameters may also be communicated and used for asset management purposes. In an embodiment, the beacon 404 may be a stand-alone device that operates independent of the machine 402. Alternatively, the beacon 404 may be in communication with the input/output (I/O) unit 412 and/or processing unit 408 for collecting and performing, communication of data, such as beacon ID 416, metadata, or otherwise (e.g., operational data, inventory data). The beacon 404 may be powered by the machine 402 or may be powered independent of the machine by a local power source (e.g., wall socket). The antenna 406 may be configured to communicate via a local wireless communications network, such as Wi-Fi®, Bluetooth®, or otherwise, and be used to communicate information associated with the machine 402, such as Mac ID, network ID, operational information, inventory information, time stamp, or otherwise, to a mobile device 418 on which an application 420 is operating.

As further shown, the content management system 422 may include a storage unit 424 on which a data repository 426 operates. The content management system 422 may be configured to store content that may be communicated the mobile device 418 in response to the mobile device 418 communicating information 428 associated with the beacon 404 that is associated with the machine 402. As shown, information being communicated to the CMS 422 includes the beacon ID 416, user ID 430, machine information (e.g., Mac ID/network ID, operational information, inventory information), timestamp, and/or any other information for accessing and selecting content stored in the data repository 426. Content 432, which is selected by the CMS 422 based on any of the received information, may be communicated to the mobile device 418 for use or display by the mobile app 420.

Figure 5A:
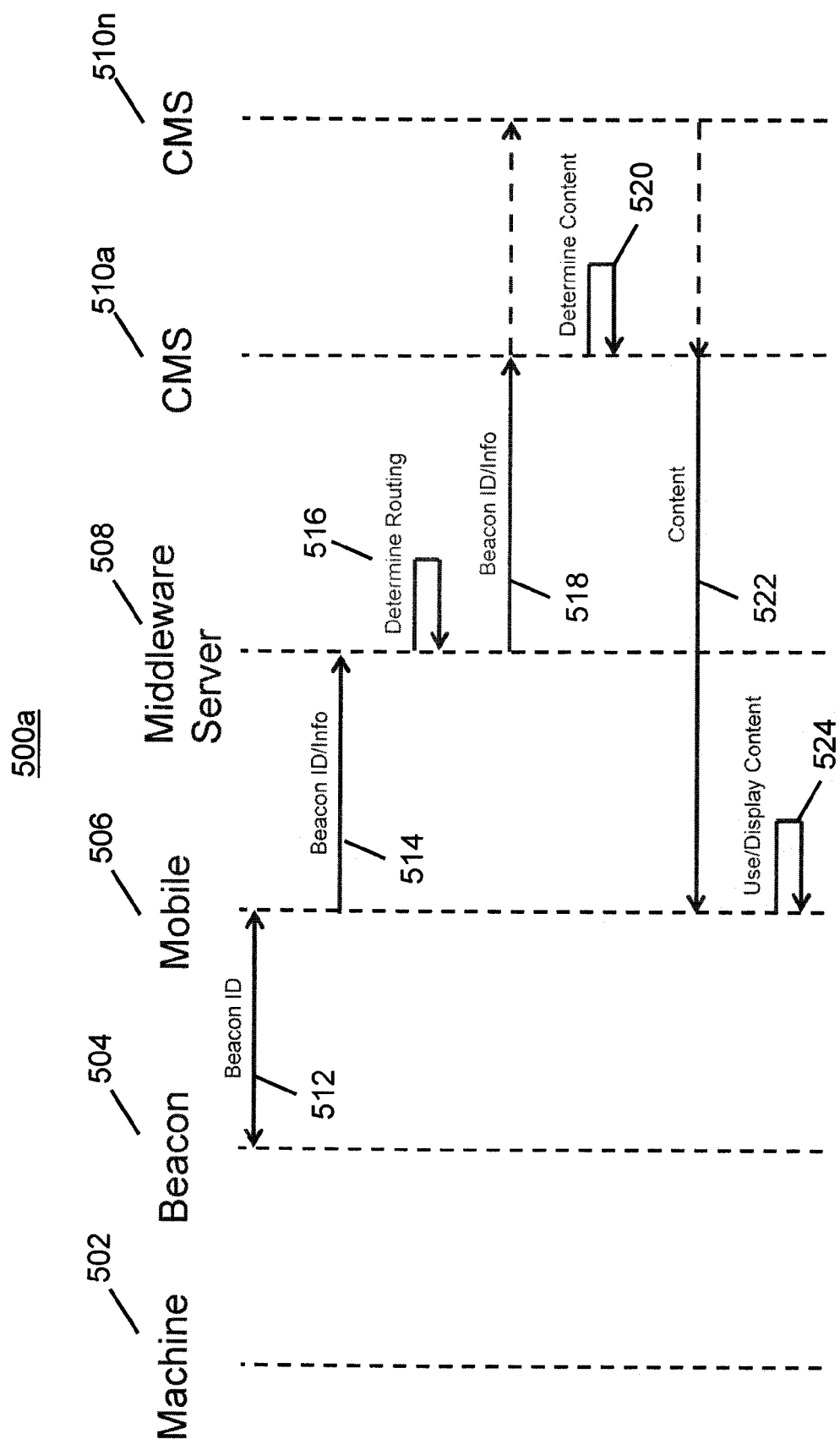
FIG. 5A is an illustration of an illustrative process supported by a communications network having multiple devices.

With regard to FIG. 5A, a process 500a supported by a communications network having multiple devices is shown. The devices of the communications network may include a machine 502 configured to provide (e.g., dispense, vend, etc.) consumer products, such as beverages, to consumers in public or private locations. A beacon 504 associated with the machine 502 may be provided that allows for the communications network to be established across disparate venues and by an owner/operator of the machine 502. A mobile device 506 that may be in wireless communication with the beacon 504 when in local proximity is shown. The communications network may further include a middleware server 508 with which the mobile device 506 may be in communication for assisting with routing communications by the mobile device 506 with one or more content management system 510a-510n (collectively 510).

In an embodiment, the process 500a may start at step 512, where the beacon 504 may communicate a beacon ID at step 512. The beacon ID may be an identifier associated with the beacon. The beacon ID may take a number of different forms, including a network address, name, alphanumeric value, or any other identifier associate with the beacon 504. In addition, the beacon 504 may be configured to communicate other metadata associated with the beacon 504, such as retail location, geographic location, machine ID associated with the machine 502, and/or otherwise. The mobile device 506 may be a smart phone or other mobile electronic device that may be within range of the beacon 504. In an embodiment, the beacon 504 may be configured with Bluetooth® (e.g., Bluetooth Low Energy or BLE), Wi-Fi®, or any other wireless communications protocol with which mobile electronics devices may communicate with other devices. A range of the beacon 504 may be about 300 feet, but alternative ranges depending upon the wireless communications protocol being utilized may be possible.

In response to the mobile device 506 receiving the beacon ID at step 512, the beacon ID along with other information associated with the mobile device 506 and/or user thereof may be communicated to a middleware server 508. In an embodiment, an application being executed by the mobile device 506 may be created using an SDK, and may be configured to automatically determine that a beacon ID is received. Responsive to receiving the beacon ID, the app being executed by the mobile device 506 may be configured to cause the mobile device 506 to communicate the beacon ID and information to a middleware server 508 at step 514.

At step 516, the middleware server 508 may be configured to determine routing of the communications signal (e.g., beacon ID and info) to a network address of one of the content management systems 510. As shown, at step 518, the middleware server 508 may communicate the beacon ID and info to one or more of the content management systems 510. In determining which CMS to route the communications signal received from the mobile device 506, the middleware server 508 may utilize the beacon ID and/or any other information (e.g., mobile app ID) received from the mobile device 506. The content management system(s) 510 may process the information received from the middleware server 508, and determine content at step 520 to identify and communicate back to the mobile device 506. The content may include any content that the mobile app being executed by the mobile device 506 may use and/or display. At step 522, content that is selected by one or more of the content management systems 510 may be communicated to the mobile device 506 directly or via the middleware server 508. In selecting the content, the CMS may identify content scheduled to be selectable and/or distributed during day and/or time periods that meet criteria for matching information received from the mobile device 506. At step 524, the mobile device 506 may use and/or display the content received from the content management systems 510.

Figure 5B:
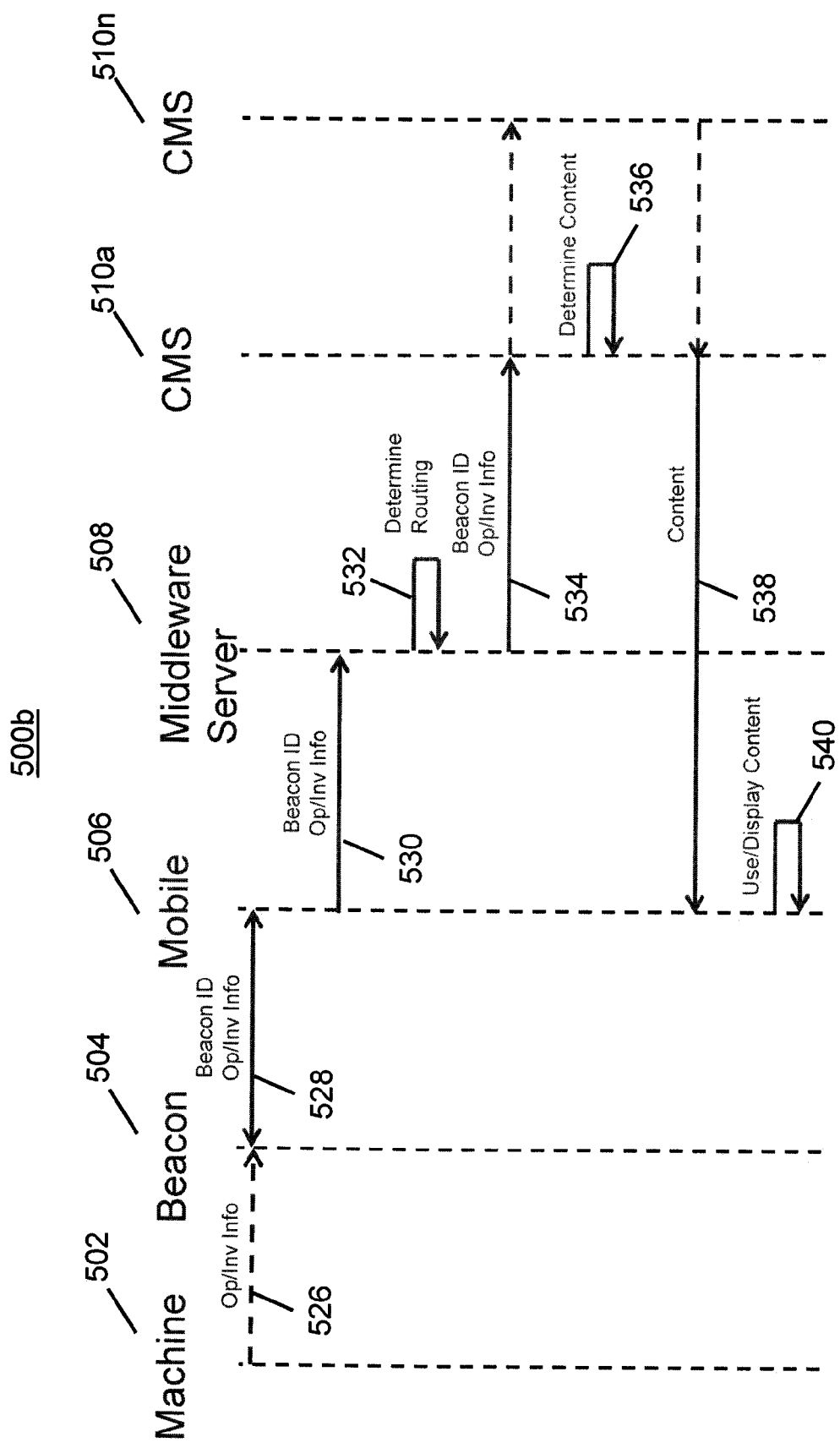
FIG. 5B is an illustration of an illustrative process for performing communications on a machine communications network with a machine having a dispenser located thereat.

With regard to FIG. 5B, an illustrative process 500b for performing communications on a machine communications network with a machine 502 having a beacon 504 located thereat is shown. The process 500b may start at step 526, where the machine may collect and communicate machine operational and/or inventory information. The inventory information may be information, such as number or amount remaining of one or more type, of consumer product(s) being provided by the machine 502. In an embodiment, the operational and/or inventory information may be communicated via the beacon 504. In an alternative embodiment, rather than the machine 502 communicating the operational and/or inventory information via the beacon 504 to the mobile device 506, the machine 502 may utilize an alternative transmitter to communicate the operational and/or inventory information to the mobile device 506. The beacon 504 may thereafter communicate a beacon ID and the operational and/or inventory information to the mobile device 506. At step 530, the beacon ID and operational and/or inventory information may be communicated to the middleware server 508. At step 532, the middleware server 508 may determine routing for the beacon ID and operational and/or inventory information to one of the content management systems 510. The determination may be based on a number of factors and parameters as previously described. It should be understood that additional information, such as user ID, geographic location, etc., may be communicated by the mobile device 506 through the middleware server 508. It should also be understood that the operational and/or inventory information may be communicated directly to a network independent of the middleware server 508. By routing machine operational and/or inventory data via a mobile app of users that may not be available to the users, inventory tracking of a commercial machine may be performed in an inexpensive manner by not having to establish alternative, commercial communication techniques.

At step 536, content management system 510 may determine or select content to be communicated back to the mobile device 506 based on the beacon ID, operational and/or inventory information, user ID, and so forth. If, for example, a determination is made that the operational information of the machine 502 is indicative of the machine 502 not working properly (e.g., broken pump, low temperature, etc.), then the CMS 510a may select a first content as opposed to a second content had a determination been made that the machine 502 is working properly. As another example, if a determination is made that the inventory of the machine 502 is high (e.g., fully stocked inventory of at least one consumer product), then the CMS 510a may select content associated with the inventory to be communicated to the mobile device 506. If, for example, a determination is made that the inventory is low, then a determination may be made to select content that is not associated with the inventory since the use of the mobile device 506 may not be able to purchase that inventory at the machine 502. In other words, content selection may be dynamic for or away from content related to inventory at the machine 502 based on operational and/or inventory parameter(s) of consumer products available by the machine 502, thereby creating a dynamic content selection and distribution process. At step 538, the selected content may be communicated to the mobile device 506, and the content may be used and/or displayed by the mobile device 506. For example, the content may be used by a mobile app being executed by the mobile device 506.

Figure 5C:
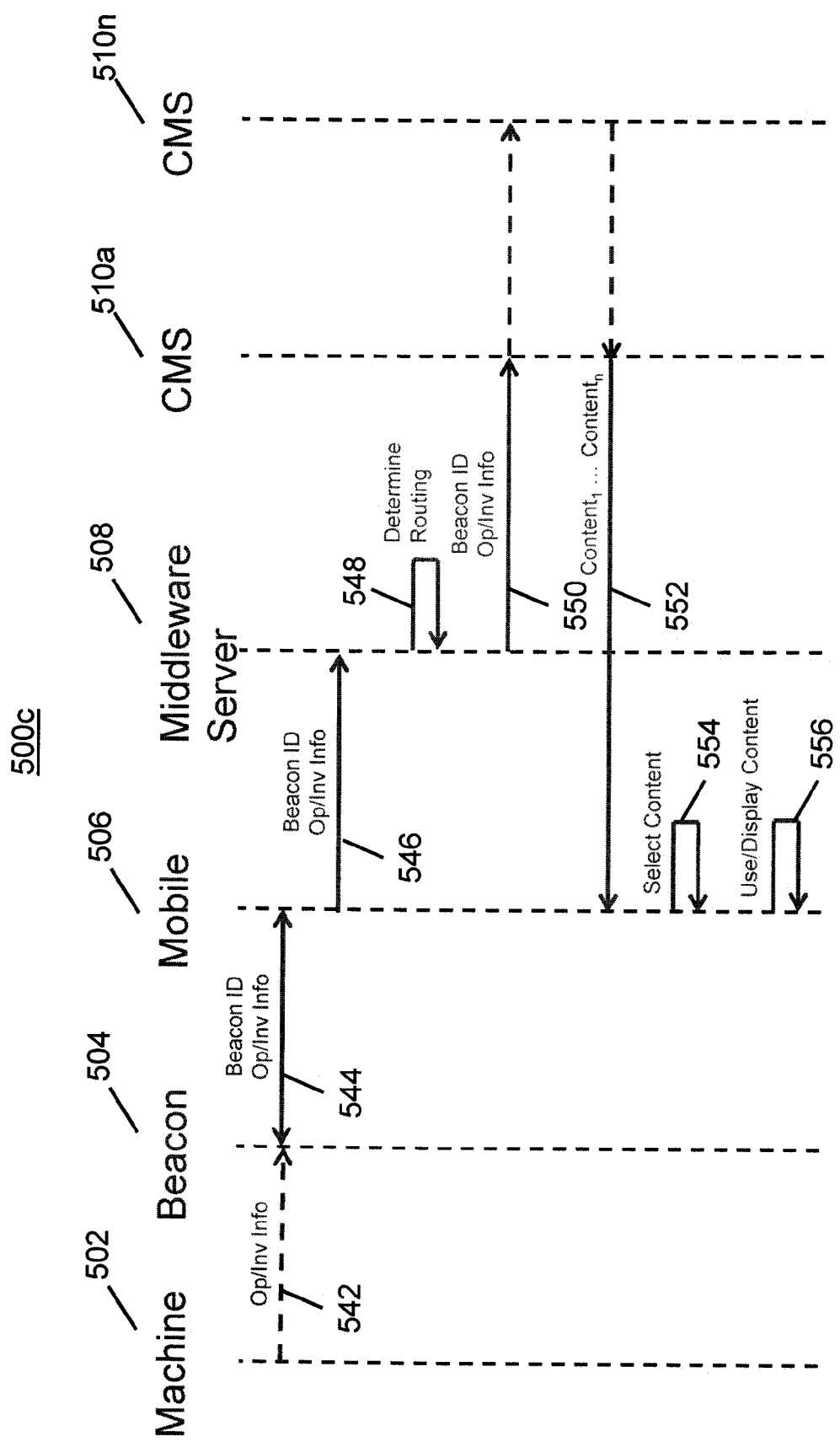
FIG. 5C is an illustration of another illustrative process for operation of a machine communications system.

With regard to FIG. 5C, another illustrative process 500c for operation of a machine communications system is shown. The process 500c may start at step 542, where the machine 502 may communicate operational and/or inventory information to the beacon 504 for communication to the mobile device 506 along with a beacon ID. In an alternative embodiment, the machine 502 may be configured to communicate the operational and/or inventory information directly to the mobile device 506. In an embodiment, the machine 502 may communicate with the mobile device 506 via a separate communications channel (e.g., Wi-Fi®, Bluetooth®, etc.) after the beacon ID 506 has been communicated to the mobile device 506 by the beacon 504. In an embodiment, the beacon ID may be communicated directly by the machine 502 to the mobile device 506 along with the operational and/or inventory information.

At step 546, the beacon ID and operational/inventory information may be communicated by the mobile device 506 to the middleware server 508. Middleware server 508 may determine routing for data, such as the beacon ID and operational and/or inventory information, from the mobile device 506 to one or more of the CMSs 510 based on the beacon ID, geography, retailer, user ID, mobile app ID, and so on. At step 550, the beacon ID, operational and/or inventory information may be communicated to the determined CMS for processing thereby. At step 552, $content_1$-$content_n$ ("content packets") may be communicated to the mobile device 506 from the determined one or more of the CMSs 510. As an example, the content packets may include multiple sets of data (e.g., prizes, game pieces, images, etc.) such that at step 554, the mobile device 502 (or mobile app being executed thereon), may select any of the content packets for use or display thereat at step 556. By using this communications configuration, the mobile device 506 may operate independent of the CMSs 510 after receiving the content packets. In an alternative embodiment, one or more of the CMSs 510 may communicate selectable content packets to the mobile device 506.

Figure 5D:
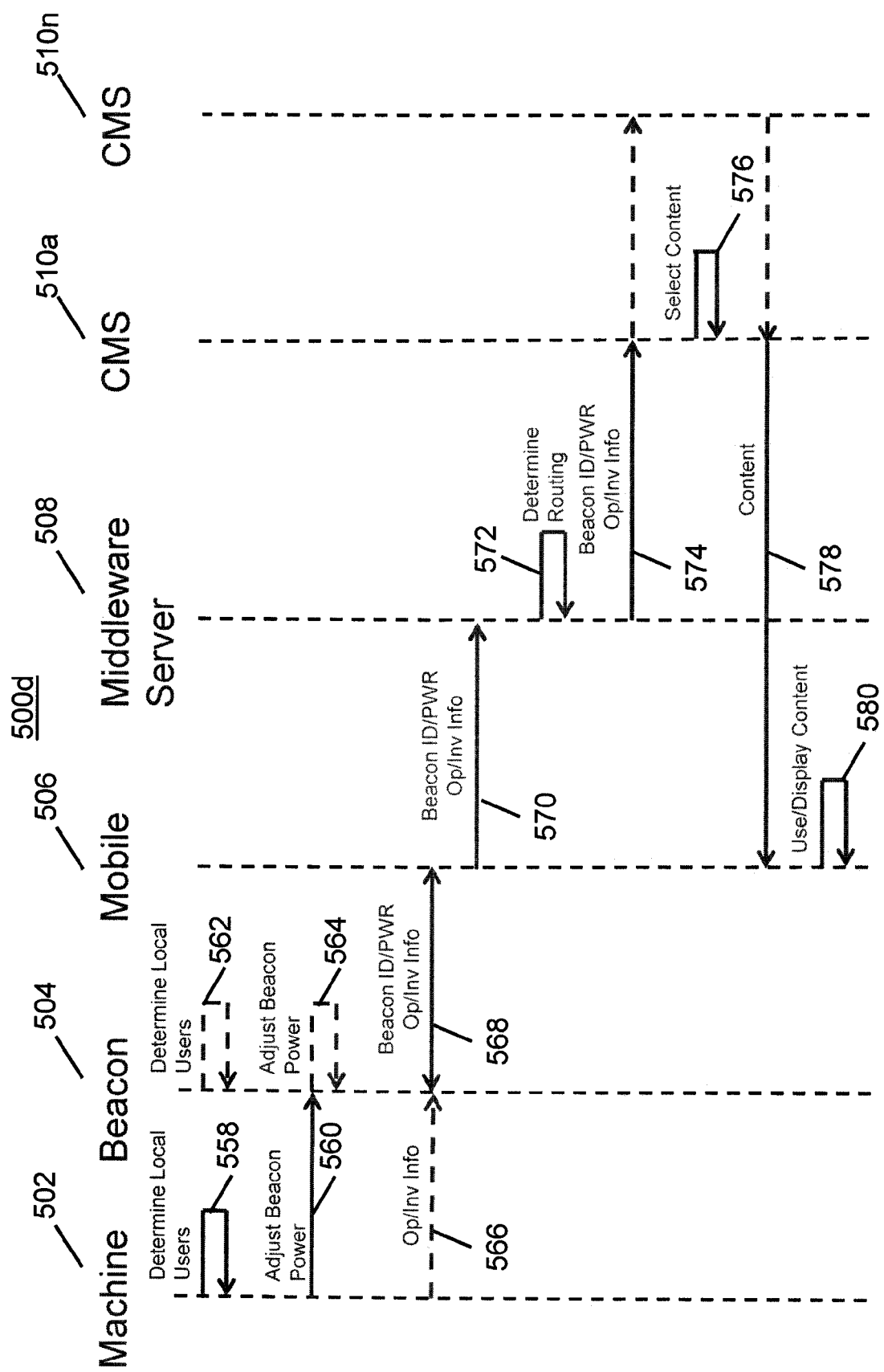
FIG. 5D is an illustration of another illustrative process of a variable power performed on the machine communications network.

With regard to FIG. 5D, another illustrative process 500d that provides for variable power of a beacon signal performed on the machine communications network is shown. The process 502 may start at step 558, where the machine 502 via a communications device (not shown) may determine a number of local users over time. The machine 502 may include electronics that performs the determination of number of users over time (e.g., every 1 minute, every 10 minutes, every hour, etc.). By determining number of local users, the machine 502 or other device, such as the beacon 504, may determine whether to increase or decrease power of a local wireless communications device so as to be automatically or programmatically dynamic. In an embodiment, such a determination may be made independent of the machine (e.g., by another sensor or visually).

At step 560, the machine 502 may cause power of the beacon to be adjusted 504 such that the beacon is capable of communicating with more or fewer mobile devices. As an example, if a store is not full, then there may be a desire to reach people outside of the store or deeper into the store. If the store is full, then a more targeted communication to people only in direct line-of-sight may be desirable to improve traffic or potential sale of products depending on the nature of content being communicated. In an alternative embodiment, the beacon 504 may be configured to determine local users at step 562, and automatically and dynamically adjust the beacon power 564 for the reasons described above. After the beacon power is established, the process may continue through steps 566-580 in the same or similar manner as FIG. 5B.

Figure 5E:
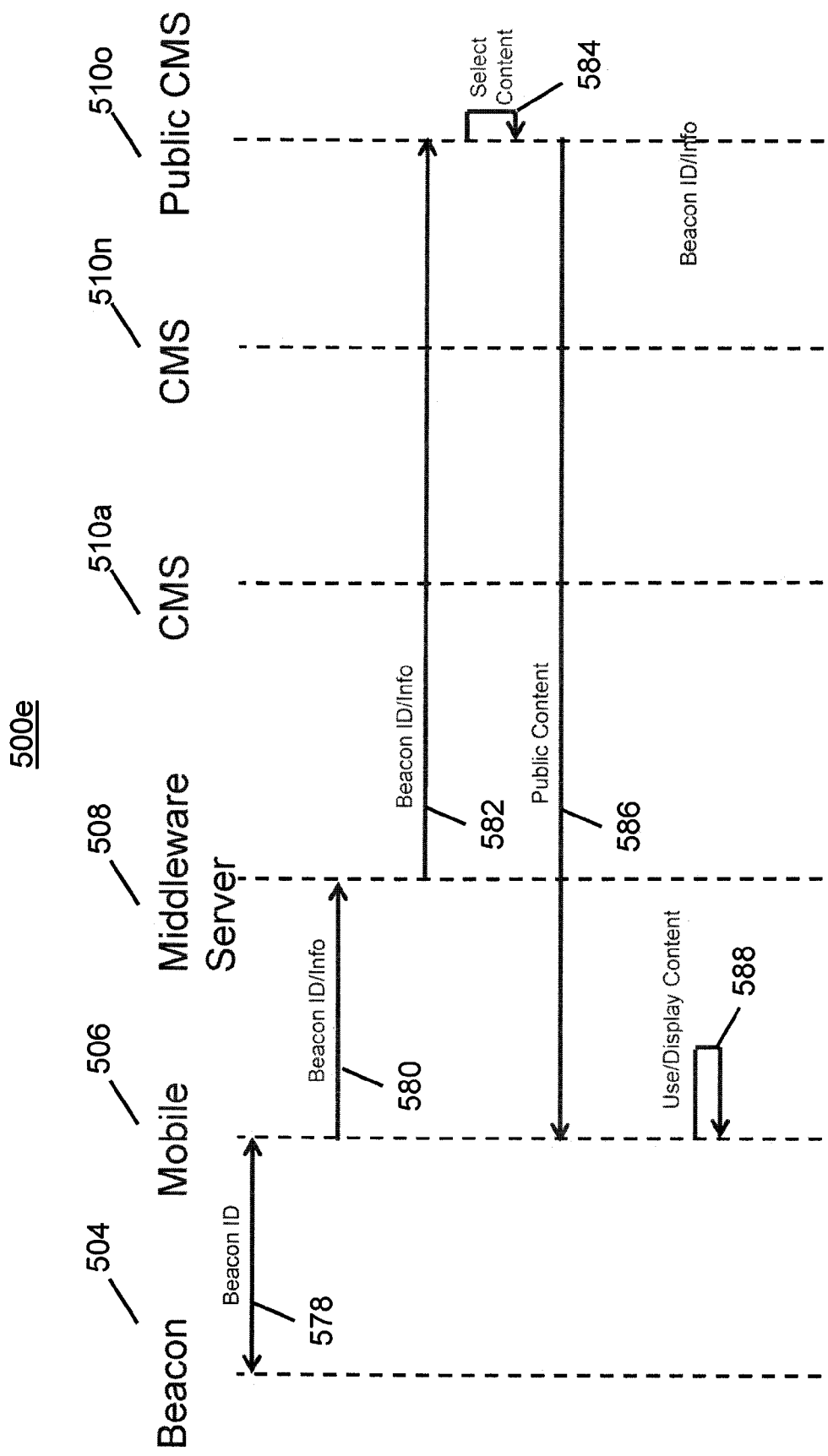
FIG. 5E is an illustration of an illustrative process for broadcasting public messages on a communications network.

With regard to FIG. 5E, an illustration of an illustrative process 500e for broadcasting public messages on a communications network is shown. The process 500e may start at step 578, where the beacon 504 may be configured to communicate a beacon ID to a local mobile device 506. The mobile device 506 may communicate the beacon ID along with information, such as user ID, to the middleware server 508. The middleware server 508 may, in turn, communicate the beacon ID and information at step 582 to a public CMS 510o that may be used to communicate public service announcements or other broadcast messages to all users who are within communication range of beacons of the communications system. In this case, the middleware CMS 508 may be configured to determine whether to route the beacon ID and information to any of the CMSs 510 and/or public CMS 510o. At step 584, the public CMS 510o may select content, and the content may be communicated at step 586 to the mobile device 506 via middleware server 508 or directly to the mobile device 506. Such public content may be communicated to mobile devices local to mobile devices that are local to all or a subset of beacons at the network of machines. At step 588, the mobile device 506 may use and/or display the content thereon.

As discussed above, the pending application facilitates proximity marketing to mobile devices within range of a beacon. Depending on the wireless technology used by the beacon, the range may be between 6-60 feet (e.g., Bluetooth®) or upwards of 300 ft. or more (e.g., WIFI). This is in contrast to traditional geofencing proximity marketing which may only have an accuracy to within 1 kilometer or may not be available at all in some interior locations. Such geofencing proximity detection may be accurate enough to determine that a consumer is at a particular retail location, but not accurate enough to detect where the consumer is within the retail location. Other proximity marketing techniques may rely on consumers scanning QR codes or other such localized tags, but these solutions require active involvement by the consumer. The pending application facilitates proximity marketing to consumer mobile devices at precise locations within a retail location, such as at a point-of-sale terminal, without requiring active involvement by the consumer.

A mobile app produced in conjunction with the SDK is configured to automatically determine that a beacon ID is received from a beacon. As a result of using the SDK, the beacon ID is then communicated to the middleware server. The app may be configured with a network address of the middleware server to which to send information including the beacon ID and other metadata, as discussed above.

The SDK also configures the mobile app to locally maintain a time-out list of detected beacon IDs. Upon detecting a beacon ID, the mobile app will compare the detected beacon ID to beacon IDs on the time-out list. If a match is not found, the mobile app will add the detected beacon ID to the time-out list and then send the detected beacon ID and other metadata to the middleware server. If a match is found, the mobile app will not send the detected beacon ID to the middleware server. After a predetermined period of time, the detected beacon ID may be removed from the time-out list. Other methods of removing beacon IDs from the time-out list may be used, such as upon moving a predetermined distance away from the detected beacon ID (e.g., using geofencing or other location determination). In this way, the mobile app may prevent multiple proximity marketing messages from being delivered to the mobile device running the mobile app based on detecting the same beacon ID multiple times. The predetermined period of time or predetermined distance may be adjustable based on the venue in which the beacon is present.

For example, in a shopping retail environment where a consumer is frequently moving around within the retail environment, a mobile app of the consumer may detect the same beacon ID multiple times in frequent succession. In such a venue, the predetermined period of time may be set to provide a single proximity marketing opportunity or "spot" for a single visit to the retail location (e.g., the predetermined period of time may be equal to an average shopping time for a visitor to that retail location). Other amounts of time may be used to provide for more or fewer "spots".

If a match between the detected beacon and the beacon IDs on the time-out list is not found, the mobile app may also add a decay value with the entry on the time-out list. For example, the decay value may be a time-stamp of when the beacon ID was detected. Alternatively or additionally, the decay value may be a location (e.g., geographic coordinates, cell tower ID, or other location determination value) of where the beacon ID was detected. Periodically, the mobile app will update the time-out list to remove beacon IDs with a decay value that is outside of a decay threshold. For example, if a difference between a current time and a time-stamp on the time-out list is greater than the predetermined period of time, then the corresponding beacon ID may be removed from the time-out list.

Likewise, in some venues, the mobile app may detect a set of multiple distinct beacon IDs in succession. For example, a bank of multiple machines 106 may be at a single location in a retail environment, each with their own beacon 108 broadcasting their unique beacon IDs. Because they are distinct beacon IDs, the mobile app will communicate each of the set of multiple distinct beacon IDs along with other metadata to the middleware server. The metadata includes a device ID of the mobile device where the mobile app is executing.

Upon receiving a message from a mobile app with a beacon ID and the metadata, the middleware server will compare the device ID in the metadata to device IDs on a server time-out list. If a match is not found, the middleware server will add the device ID to the server time-out list and then determine which CMS to send a notification to of an available proximity marketing opportunity ("spot"). If a match is found, the middleware server will not send a notification to any of the CMSs and instead will do nothing further to process the message received from the mobile app. Likewise, the middleware server will not send a notification to any of the CMSs and instead will do nothing further to process the message received from the mobile app if the beacon ID is not found on a list of valid beacon IDs.

After a predetermined period of time, the device ID may be removed from the server time-out list. Other methods of removing device IDs from the server time-out list may be used, such as upon moving a predetermined distance away from a beacon ID identified in the message received by the middleware server (e.g., using geofencing or other location determination). In this way, the middleware server may prevent multiple proximity marketing messages from being delivered to the mobile device with the device ID based on detecting different beacon IDs from the same mobile device in quick succession. The predetermined period of time or predetermined distance may be adjustable based on the venue in which the beacon is present.

As discussed above, the middleware server may select one or more of the CMS servers to communicate a notification of the detected beacon ID and metadata. For example, each beacon ID may be maintained in a beacon database by the middleware server. The beacon ID may be stored in the beacon database in association with a venue ID (e.g., an outlet ID, an identification of a retailer, or other indication of the venue in which the beacon is located), a geotag (e.g., geographic coordinates or other location information), and an address (e.g., a street address). In some implementations, the beacon ID may additionally be stored in the beacon database in association with a venue location (e.g., an identification of where the beacon is located within the venue, such as proximate to a doorway or point-of-sale device). The middleware server may execute one or more CMS selection rules for determining which CMS to select.

For example, the CMS selection rules may prioritize notifying a first CMS associated with the machines 106 over a second CMS associated with the venue ID that corresponds with the beacon ID in the received message, which in turn may be prioritized over a third CMS associated with an otherwise unaffiliated third-party. The CMS selection rules may select different CMS systems based on a detected beacon ID and metadata matching marketing campaign rules received by the middleware server from the CMS systems. Alternatively, the middleware server may send notifications in order of CMS priority. Upon receiving a message that content is not being provided by a given CMS or the given CMS not responding to the middleware server within a predetermined period of time, the middleware server will then send the notification to the next lower priority CMS. For example, upon sending a first notification to the first CMS, the middleware server may receive a message from the first CMS indicating that no content is available to send to the mobile device. After receiving the message from the first CMS, the middleware server may send the first notification to the second CMS, which is the next lower priority CMS. The middleware server may receive a message from the second CMS indicating that content is available and will be delivered to the mobile device by the second CMS. Other rules or additional rules may be used for the CMS selection rules.

The selected CMS is configured to select or identify content determined to be associated with or be best matched to parameters contained in the received information (e.g., beacon ID and associated metadata) and configured to communicate the identified content to the mobile device. The communication of the identified content may be sent by the selected CMS directly to the mobile device via a communications channel. The communications channel that the selected CMS uses to communicate the identified content to the mobile device is different than the communications channel that the mobile device uses to detect a beacon ID and notify the middleware server. In other words, the communications path in which the proximity marketing message is delivered to the mobile device is distinct from the communication path in which the beacon ID is detected and evaluated.

For example, as discussed above, the mobile device may have a first mobile app configured based on the SDK to detect a beacon ID and notify the middleware server of the detected beacon ID. The first mobile app may communicate with the middleware server over a data link from the mobile device to the middleware server over one or more wired or wireless networks. In contrast, the selected CMS communicates the identified content to the mobile device through a different communications channel that may include sending an SMS message with the content or a link to the content to the mobile device, sending a notification through a second app on the mobile device, calling the mobile device, or otherwise communicating the identified content to the mobile device other than through the first mobile app and/or through the middleware server.

Using a distinct communications channel to communicate the identified content to the mobile device enables a diverse set of retailors or other advertisers to leverage the proximity marketing opportunities identified by the pending application while at the same time allowing for that diverse set of advertisers to communicate with consumers in familiar ways. For example, a retailer may have a mobile app that does not incorporate the functionality of the SDK described herein, but nonetheless is provided with proximity marketing opportunities to send content and/or notifications through the retailer's mobile app. Additionally, while a retailer may have a mobile app, the number of mobile devices on which the retailer's mobile app is installed may be limited. Therefore, the distinct communications channel (e.g., via a SMS or other ubiquitous mobile device messaging or notification channel) enables the retailer to provide proximity marketing opportunities to mobile devices that do not have the retailer's app installed.

Looking back to FIG. 1, the beacons 106 configured on the machines 104 form a baseline beacon network. As discussed above, this baseline beacon network is deployed in various point-of-purchase, public, and private venues 102. While extensive, the footprint of the baseline beacon network is limited to only the locations of the machines 104 configured with the beacons 106.

One or more of the venues 102 or other venues where the machines 104 may not be presents may include beacons 106 that are apart from or otherwise not associated with the machines 104. For example, a retailer may have a set of beacons 106 deployed in various locations within a retail location, such as at a doorway at the retail location, at a register in the retail location, or at a product display area in the retail location. The retailer may have multiple retail locations, each with their own set of beacons 106. The beacons owned, maintained, and deployed by the retailer 106 are referred to herein as a private beacon network. As discussed above, even if the retailer has a large number of locations, the beacon footprint of the retailer is limited to only their retail location footprint. Additionally, the retailer may have a mobile app configured to detect the set of beacons in the private beacon network and push notifications for proximity marketing within the retail location(s) of the retailer. Therefore, the ability of the retailer to implement proximity marketing using beacons is limited to only their retail location footprint and the footprint of mobile users that have downloaded the retailer's mobile app. Multiple such retailers may each independently deploy their own private beacon networks with their own mobile apps.

In some implementations, one or more private beacon networks may be registered with the middleware server 110 to create an aggregate beacon network that includes the baseline beacon network and the one or more private beacon networks. By registering their private beacon network with the middleware server 110, the retailer is provided access to proximity marketing opportunities identified by the aggregate beacon network. In other words, the middleware server 110 will recognize additional beacon IDs as being valid beacon IDs for providing proximity marketing opportunities according to the present disclosure. As part of the registration process, the retailer provides messaging rules to the middleware server 110 to augment the CMS selection rules. The messaging rules may limiting how many or what types of proximity marketing messages customers may receive at their retail locations using their private beacon network. The messaging rules may also establish content guidelines limiting the type of content that may be delivered to consumers within their retail locations or otherwise limiting competitors from providing content to consumers within their retail locations. Therefore, upon selecting a CMS, the middleware server 110 may take into account the messaging rules associated with an outlet ID that is associated with a detected beacon ID in addition to marketing campaign rules described above.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed:
1. A communications network, comprising:
a plurality of machines configured to provide consumer products to consumers;
a corresponding set of networked beacons associated with said machines, said beacons being configured to communicate wireless signals with unique data respectively indicative of the networked beacons to a mobile device of a user locally positioned from any of said machines, unique data associated with a local beacon causing an app being executed by the mobile device to communicate the unique data and receive content associated with the local beacon; and
a server in communication with at least one of the machines; and wherein the at least one machine is configured to sense available consumer products at the machine, and communicate information indicative of the available consumer products to said server; wherein said server, responsive to receiving the information indicative of the available consumer products, is configured to:

communicate first information to the mobile device based on the information indicative of the available consumer products being over a predetermined level, wherein the first content is associated with the available consumer products; and communicate second information to the mobile device based on the information indicative of the available consumer products being below the predetermined threshold, wherein the second content is not associated with the available consumer products.

2. The communications network according to claim 1, further comprising a first server configured to (i) receive a communication signal from a mobile device and (ii) route the communication signal to a second server that is storing content related to the unique in the wireless signal.

3. The communications network according to claim 2, wherein the second server is a content management system server of a plurality of available content management system servers.

4. The communications network according to claim 1, further comprising:
wherein at least one of the machines is configured to:
sense at least one operational parameter of said machine; and
communicate the at least one sensed operational parameter to said server for processing thereby.

5. The communications network according to claim 4, wherein said server is configured to select information to communicate to the mobile devices based on the at least one sensed operational parameter.

6. The communications network according to claim 5, wherein the at least one sensed operational parameter is a temperature at which the consumer products are being maintained.

7. The communications network according to claim 1, wherein the beacons are configured to have variable communications power levels, and wherein the communications power levels are adjusted inversely based on numbers of mobile devices communicated with over a time period.

8. The communications network according to claim 1, further comprising a middleware server configured to receive information associated with the user of the mobile device, and, responsive thereto, select and communicate the received information that causes a server at the network address to distribute content to the mobile device of the user.

9. A method for providing a communications network, said method comprising:
disposing a corresponding set of networked beacons associated with a plurality of machines positioned configured to provide consumer products to consumers;
communicating, by the beacons, wireless signals with unique data respectively indicative of the networked beacons to a mobile device of a user locally positioned from any of the machines, unique data associated with a local beacon, the unique data causing an app being executed by the mobile device to communicate the unique data and receive content associated with the local beacon in response to the communication of the unique data;
determining available consumer products at the machine; and
responsive to determining the available consumer products at the machine, communicating information indicative of the available consumer products to a first server;

wherein the first server, in response to receiving the information indicative of the available consumer products, performs the steps of:
communicating first information to the mobile device based on the information indicative of the available consumer products being over a predetermined level, wherein the first content is associated with the available consumer products, and
communicating second information to the mobile device based on the information indicative of the available consumer products being below the predetermined threshold, wherein the second content is not associated with the available consumer products.

10. The method according to claim 9, wherein disposing a corresponding set of networked beacons includes disposing a corresponding set of networked beacons on machines configured to dispense, vend, and/or cool consumer products from which consumers obtain the consumer products.

11. The method according to claim 9, further comprising:
receiving, by the first server, a communication signal from a mobile device; and
routing the communication signal to a second server that is storing content related to the unique in the wireless signal, wherein routing the communication signal to a second server includes routing the communication signal to a content management system server selected from amongst a plurality of available content management system servers.

12. The method according to claim 9, further comprising:
sensing at least one operational parameter of the machine;
communicating the at least one sensed operational parameter to the first server for processing thereby; and
selecting, by the first server, information to communicate to the mobile devices based on the at least one sensed operational parameter.

13. The method according to claim 12, wherein sensing at least one operational parameter includes sensing a temperature at which the consumer products are being maintained.

14. The method according to claim 9, further comprising storing a data repository that logical defines the beacons in groups based on physical locations of the corresponding machines, and wherein content communicated to mobile devices is at least partially mutually exclusive from content associated with beacons in different logical groups.

15. The method according to claim 9, further comprising variably adjusting communications power levels output by a beacon, and wherein variably adjusting the communications power levels includes variably adjusting the communications power levels inversely based on numbers of mobile devices communicated with over a time period.

16. The method according to claim 9, further comprising receiving information associated with the user of the mobile device, and, responsive thereto:
selecting a network address to which to communicate the received information; and
receiving content by the mobile device of the user in response from the network address.

17. The method according to claim 9, further comprising provisioning each of the machine and beacon combinations, the provisioning including a network address or identifier of the beacons, machine ID, and geographic location.

* * * * *